US006913158B1

United States Patent
Bösl et al.

(10) Patent No.: US 6,913,158 B1
(45) Date of Patent: Jul. 5, 2005

(54) CLOSURE CAP

(75) Inventors: Udo Bösl, Eimeldingen (DE); Erich Simmen, Känerkinden (CH)

(73) Assignee: Crown Cork & Seal Technologies Corporation, Alsip, IL (US)

( * ) Notice: Subject to any disclaimer, the term of this patent is extended or adjusted under 35 U.S.C. 154(b) by 0 days.

(21) Appl. No.: 10/129,553

(22) PCT Filed: Nov. 1, 2000

(86) PCT No.: PCT/GB00/04179

§ 371 (c)(1),
(2), (4) Date: Oct. 4, 2002

(87) PCT Pub. No.: WO01/34491

PCT Pub. Date: May 17, 2001

(30) Foreign Application Priority Data

Nov. 8, 1999 (EP) .................................. 99122306

(51) Int. Cl.[7] .............................................. B65D 53/00
(52) U.S. Cl. ...................... 215/341; 215/252; 215/258; 215/331
(58) Field of Search ................................ 215/341, 344, 215/345, 307, 354, 331, 330, 321, 252, 258

(56) References Cited

U.S. PATENT DOCUMENTS

| 4,276,989 A | * | 7/1981 | Hicks .......................... 215/27 |
| 5,133,471 A | * | 7/1992 | Pujol Almirall ............ 215/331 |
| 5,197,621 A | * | 3/1993 | Bartl et al. .................. 215/331 |
| 5,667,089 A | * | 9/1997 | Moore ......................... 215/351 |
| 5,871,111 A | * | 2/1999 | Pfefferkorn et al. ........ 215/307 |
| 6,044,994 A | * | 4/2000 | Miller ......................... 215/344 |
| 6,502,710 B1 | * | 1/2003 | Bosl et al. .................. 215/351 |
| 6,622,460 B2 | * | 9/2003 | Gregory ...................... 53/490 |

FOREIGN PATENT DOCUMENTS

JP  08156951 A  * 6/1996  .......... B65D 41/04

* cited by examiner

Primary Examiner—Derris H. Banks
Assistant Examiner—Ali Abdelwahed
(74) Attorney, Agent, or Firm—Diller, Ramik & Wight

(57) ABSTRACT

A closure cap for a container containing carbonated beverages has a head plate (2) and a substantially cylindrical cap skirt (4) extending from the edge (3) of the head plate (2). A cap thread (6) is provided on the inside (5) of the cap skirt (4). In the transition region (7) between the head plate (2) and the cap skirt (4) reinforcing ribs (8) are provided, which extend up to the head plate (2).

19 Claims, 4 Drawing Sheets

CLOSURE CAP

This application is the US national phase of international application PCT/GB00/04179 filed 1 Nov. 2000, which designated the US. PCT/GB00/04179 claims priority to EPO Application No. 99122306.6, filed 8 Nov. 1999. The entire contents of these applications are incorporated herein by reference.

BACKGROUND OF THE INVENTION

The invention concerns a closure cap, in particular a closure cap for a container containing carbonated beverages.

A large number of different embodiments of screw closure caps made of plastics material are used today for the closing of containers, such as e.g. beverage bottles.

The final position, when the closure cap is in its fully screwed-on state, is determined on the one hand by the screwing-on, twisting moment and on the other hand, by the relationship between geometry of the closure cap and the container mouth. In particular, in the case of closure caps with internal lip seals, the final position of the closure cap is reached, when the inside of the cap top plate rests against the front side of the container mouth in the manner of a stop.

One problem with such known closure caps consists in so-called overturning. If a user mistakenly tries to twist a mounted closure in the wrong direction using force (i.e. continuing to screw-on instead of unscrewing) there is a danger that the threads of the closure cap may snap over the threads of the container mouth. Thus, the closure cap may temporarily become disengaged from the container mouth. In particular, in the case of bottles with contents held under pressure, such as carbonated beverages for example, there is a danger that at the same time, the closure may fly off the bottle i.e. missiling. Such missiling can injure the user.

Overturing safeguards have already been suggested, which prevent such overturning or in the event of overturning lead to a controlled gas blow-off. In WO95/21095 a braking element is described, which is arranged outside the thread path used to mount the closure and which, in the event of attempted overturning, engages with the thread of the container mouth. Overturning is thereby avoided.

This solution has the disadvantage that the closure cap is greatly deformed in the radial direction in the event of overturning.

Braking elements are also known, which define the end of the screwing-on process; thus from WO 90/10581 a braking element acting in the axial direction or in the circumferential direction is known, which towards the end of the screwing-on process engages with the start of the thread of the container mouth and so limits the screwing-on process.

SUMMARY OF THE INVENTION

An aim of the present invention is to avoid the disadvantages of the known overturn protection arrangements. In particular, an aim of the invention is to create a closure cap, which effectively prevents overturning when the closure cap is mounted on the container mouth and at the same time effectively prevents deformation of the cap in the event of an attempt at overturning. The closure cap according to the invention, may be produced easily and can be used on conventional closure mouths.

As in conventional closure caps, the closure cap consists of a head plate and a more or less cylindrical cap skirt, which extends from the edge of the head plate. On the inside of the cap skirt a thread is provided, which can be brought into engagement with a complimentary thread on the container mouth.

In the transition zone between the head plate and the cap skirt, reinforcing ribs, which extend up to the head plate, are arranged on the inside of the cap skirt. In the case of a closure-cap-having an outer seal arranged in the transition zone between cap skirt and head plate, the reinforcing ribs can only extend below the outer seal.

The closure cap according to the invention has no additional braking elements, which limit the screwing-on movement. The end of the screwing-on movement is therefore determined by the fact that the inside of the head plate rests against the front side of the container mouth.

The reinforcing ribs between the head plate and the cap skirt effectively counteract the overturning of the closure cap, even when increased force is applied. The reinforcing ribs stiffen the cap skirt and head plate in the transition zone, so that radial bulging of the cap skirt or excessive spreading between the head plate and cap skirt is avoided.

According to a preferred embodiment of the invention, the reinforcing ribs are arranged in an area towards the head plate-side of the cap thread, as seen in the circumferential direction.

Advantageously, the reinforcing ribs extend in the axial direction downwards at least as far as an imaginary screwing line, which corresponds more or less to the continuation of the cap thread. The reinforcing ribs thereby form an extension of the cap thread.

Where the reinforcing ribs extend below the imaginary screwing line, a braking effect and an additional overturning safeguard is produced at the end of the screwing-on process.

Advantageously, the reinforcing ribs extend more or less around an angular sector of 90°, which seen in the circumferential direction lies next to the end of the cap thread.

In a further preferred embodiment additional, second reinforcing ribs can be provided in the transition region between head plate and cap skirt. These second reinforcing ribs are arranged outside the angular sector over which the reinforcing ribs extend. The length of the second reinforcing ribs in the axial direction is more or less equal. The second reinforcing ribs thus have a stiffening function and do not form any continuation of the cap thread. The second reinforcing ribs moreover, run on and so likewise limit the screwing-on movement.

The reinforcing ribs and/or the second reinforcing ribs advantageously extend sufficiently inwards in the radial direction that their inner faces lie on an imaginary cylindrical section. The imaginary cylindrical section essentially corresponds to more or less the cylindrical outer face of the container mouth. In this way, the reinforcing ribs (and if necessary the second reinforcing ribs) additionally have a centring effect.

The reinforcing ribs are particularly advantageous, where the closure cap is provided with a stop face on the inside of the head plate, which engages with the front side of the container mouth when the closure cap is mounted on the container. In this way, the screwing-on position is defined exactly. Forces acting on the head plate, which would normally result in a deformation of the head plate, are directed into the cap wall through the reinforcing ribs. Because of the reduced deformability of the head plate, the reinforcing ribs give both an exactly defined end position of the closure cap and also an overturning safeguard. In addition, an overturn safeguard such as that described in WO 095/2105 can be used particularly advantageously. In this arrangement, the reinforcing ribs are arranged opposite the braking element e.g. two sets of reinforcing ribs can be provided. The content of WO 95/21095 is expressly incorporated by reference in the present application.

The invention is described below in more detail by means of example embodiments explained by means of the drawings. They show:

DESCRIPTION OF THE PREFERRED EMBODIMENTS

Figure 1:
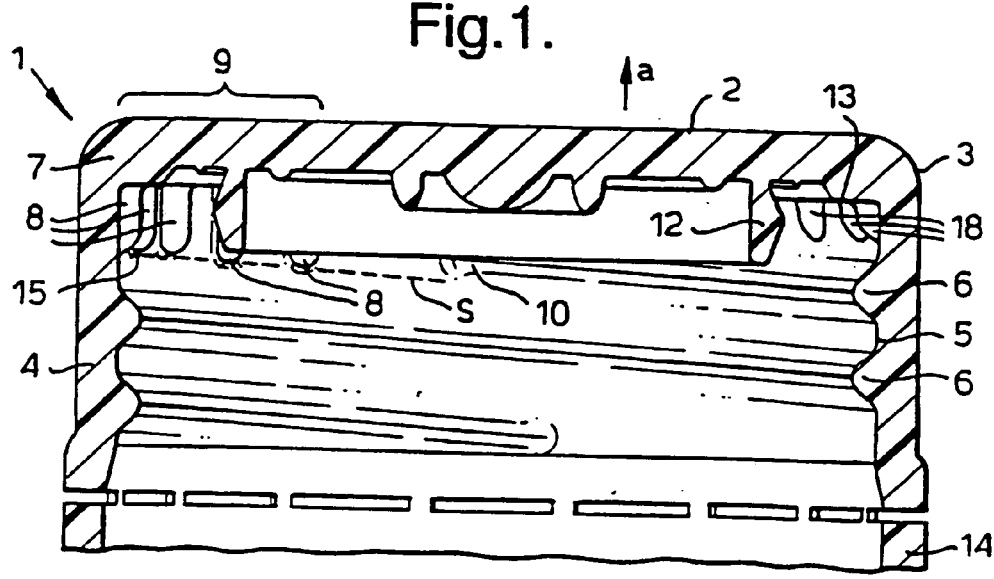
FIG. 1 a cross section through a closure cap according to the invention along the plane A—A indicated in FIG. 4, FIG. 2 a schematic perspective representation of a cut-open closure cap mounted on a container mouth, FIG. 3 an enlarged representation of the transition zone between head plate and cap skirt of a closure cap according to the invention mounted on a container mouth, FIG. 4 an underneath view of the closure cap according to the invention, FIG. 5 an enlarged representation of the cut-out section C from FIG. 4, FIGS. 6a and 6b schematic representations of further embodiments of the invention, and FIG. 7 a schematic representation of an embodiment with an outer seal.

In FIG. 1 a closure cap 1 is shown in cross section. The closure cap 1 has a head plate 2. From the edge 3 of the head plate 2 extends a substantially cylindrical cap skirt 4. The cap skirt 4 is provided on its inside 5 with a cap thread 6. The cap thread 6 is used for screwing the closure cap 1 on to a container mouth 21 having a mouth thread 26 (see FIG. 2).

The closure cap 1 is provided with a conventional inner seal 12. The closure cap 1 may also have a guarantee band 14.

On the inside of the head plate 2 is a stop 13, which comes into engagement with the front side 23 of the container mouth 21 (see FIG. 3) when closure cap 1 is mounted on the container.

In the transition zone 7, between the head plate 2 and the cap skirt 4, reinforcing ribs 8 are provided on the inside 5. The reinforcing ribs 8 extend in the axial direction up to the head plate 2 and up to the stop 13 respectively. The reinforcing ribs 8 stiffen the head plate 2 and the cap skirt 4 in the transition zone 7. Because of this stiffening, overturning of the closure cap is avoided.

The reinforcing ribs 8 are arranged in a region 9, which lies next to the end 10 of the cap thread 6, when viewed in the circumferential direction. The term the end of the thread is used here, and below, to describe the head plate-side end 10 of the cap thread 6.

The length 1 of the reinforcing ribs 8 has been chosen so that the lower edge 15 of the reinforcing ribs 8 follow an imaginary screwing line S, which forms an extension of the cap thread 6.

Figure 2:
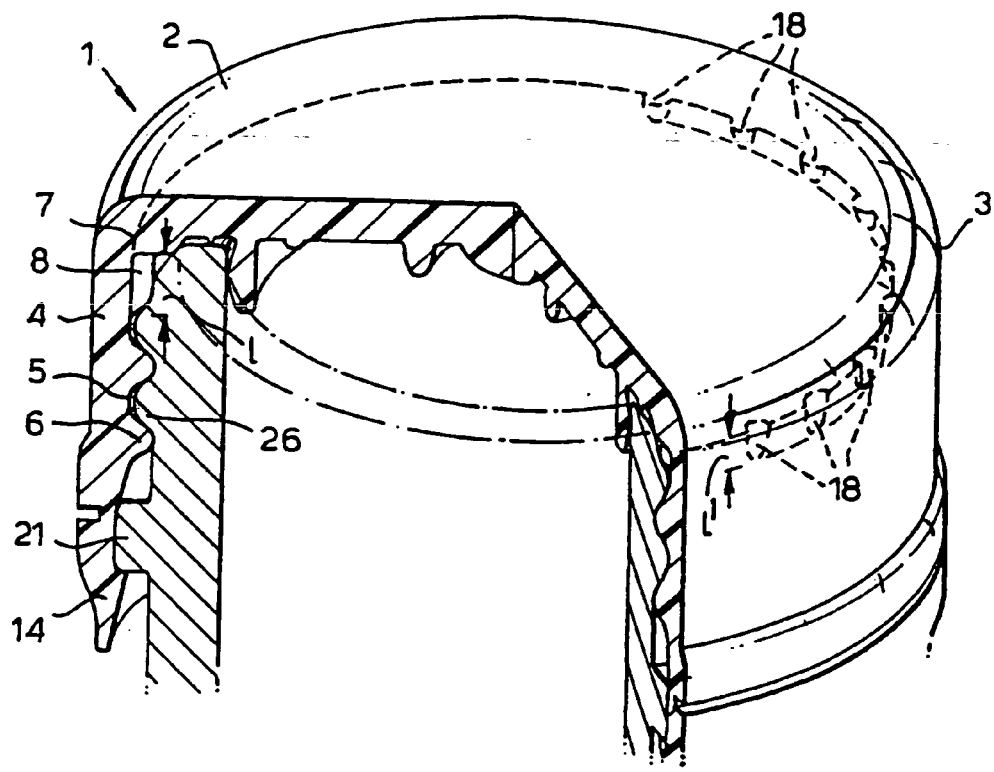

FIG. 2 is shows a perspective representation of a cut-open closure cap 1 mounted on a container mouth 21. The same reference symbols as used in FIG. 1 denote the same parts.

FIG. 2 shows that the reinforcing ribs 8 form an extension of the screw thread 6 of the closure cap 2 and follow the mouth thread 26 of the container mouth 21.

Moreover, in the right half of FIG. 2 second reinforcing ribs 18 are shown, which extend over a circumferential area of somewhat less than 180° and which are arranged diametrically opposite the reinforcing ribs 8. The second reinforcing ribs 18 are all of equal length 1'. The second reinforcing ribs 18 have only a stiffening function and form no extension of the cap thread 6 of the closure cap 1.

Figure 3:
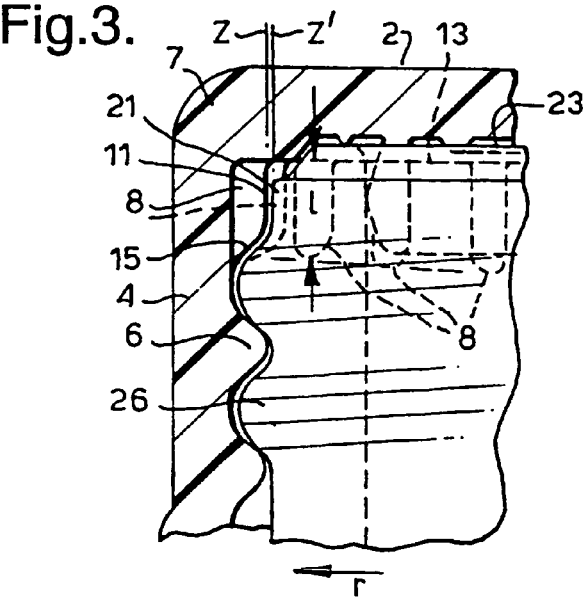

FIG. 3 shows an enlarged representation of a cross section through a cut-out of the closure cap 1 in the transition zone 7.

The closure cap 1 is in the screwed-on position. The stop 13 rests against the front side 23 of the container mouth 21. The reinforcing ribs 8 each have a different length 1. The length 1 has been chosen so that with closure cap screwed on (i.e. with abutment of the front side 23 on the stop 13) the lower edge 15 of the reinforcing ribs 8 lies against the mouth thread 26. In FIG. 3 the stiffening effect of the reinforcing ribs 8 is clear. When the stop 13 lies against the front face 23, a further twisting of the closure cap 1 is avoided, because the head plate 2 cannot move in relation to the cap skirt 4.

The reinforcing ribs 8 also have a centring function. The reinforcing ribs 8 extend inwardly in the radial direction r, such that their inner face 11 lies on an imaginary cylindrical cut-out Z. The cylindrical cut-out Z corresponds more or less to the cylindrical face Z, which is defined by the container mouth 21.

Figure 4:
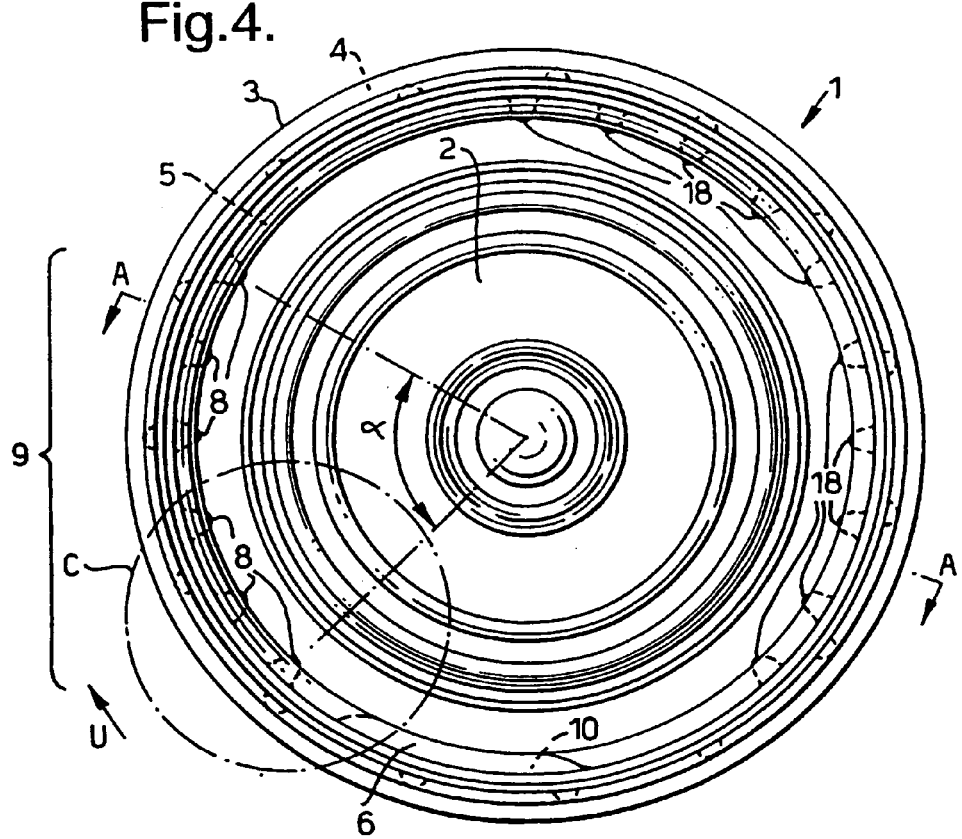

FIG. 4 shows an underneath view of the closure cap of FIG. 1. FIG. 1 corresponds to a section along the plane A—A in FIG. 4. According to FIG. 4, six reinforcing ribs 8 are arranged in a region 9, which follows immediately after the end 10 of the cap thread 6. Looking in the circumferential direction U, the region 9 adjoins the end 10 of the cap thread 6. Diametrically opposite second reinforcing ribs 18 are arranged. Ten second reinforcing ribs 18 extend through an angular region of about 150°. The second reinforcing ribs 18 have the same length L' in each case (see also FIG. 2).

Figure 5:
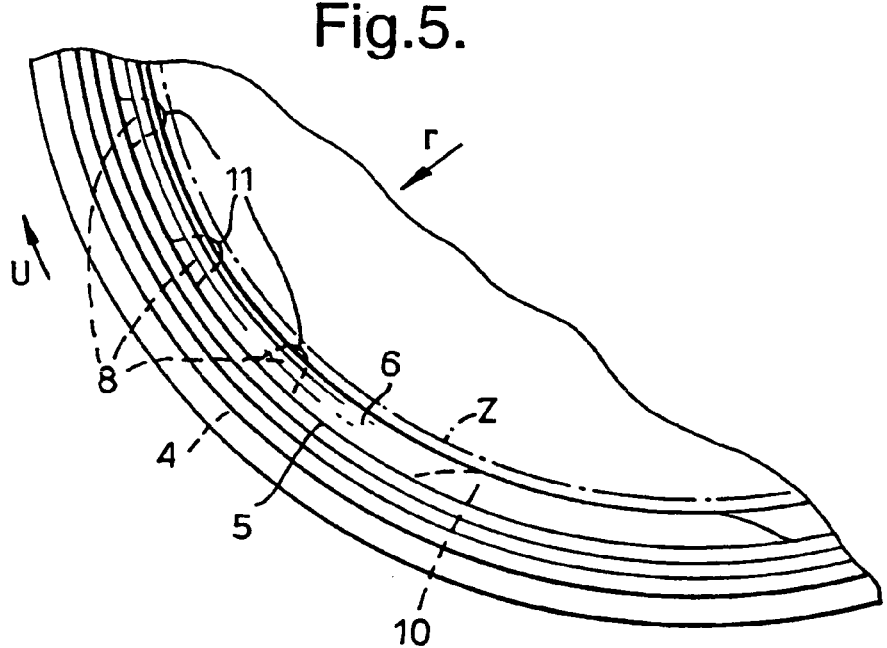

FIG. 5 shows an enlarged representation of the cut-out C from FIG. 4. The inner faces 11 of the reinforcing ribs 8 follow an imaginary cylindrical face Z. Seen in the circumferential direction U, the reinforcing ribs 8 are arranged towards the end 10 of the cap thread 6.

Figure 6A:
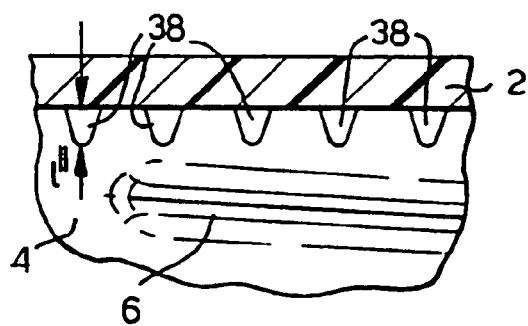
Figure 6B:
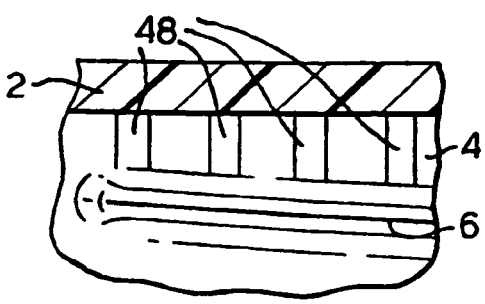

Of course, other configurations of the reinforcing ribs are also possible. For example, it is possible to distribute a plurality of equally long reinforcing ribs evenly over the circumference of the closure cap. Moreover, it is conceivable to provide reinforcing ribs, which extend from the cap thread up to the head plate. FIG. 6a represents an embodiment, in which a large number of equally long reinforcing ribs 38 are arranged evenly over the whole circumference of the closure cap. The length l'of all reinforcing ribs is identical. The lower end of the reinforcing ribs 6 is arranged above the cap thread 6. Represented schematically in FIG. 6b are reinforcing ribs 48, which extend from the lower edge of the cap thread 6 up to the head plate 2. The reinforcing ribs 48 are thereby arranged so that they lie outside the thread region used by the mouth thread 26 of the container.

The reinforcing ribs 38, 48 of FIGS. 6a and 6b also result in the desired stiffening between cap skirt 4 and head plate 2.

Figure 7:
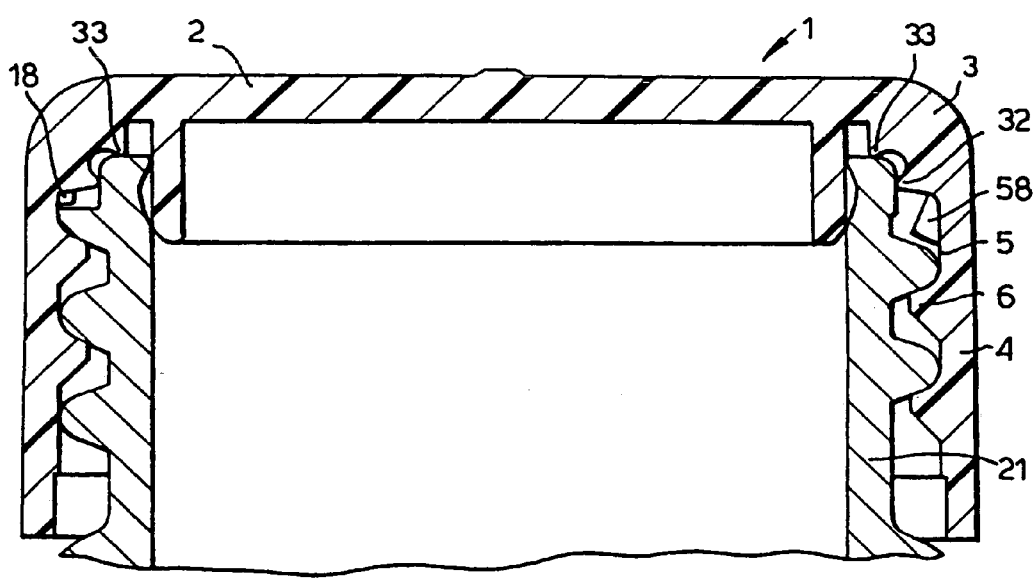

FIG. 7 shows a further alternative embodiment. The same reference symbols denote the same parts as in the previous Figures.

The reinforcing ribs 58 extend up to the underside of an outer seal 32. The stop between the container mouth 21 and the closure cap 1 takes place via a front seal 33.

Second reinforcing ribs 18 are arranged diametrically opposite the reinforcing ribs 58. The reinforcing ribs 18 abut on the start of the thread and thereby likewise have a braking effect. Because of the stiffening ribs 18, 58, any axial force applied in the event of overturning in the circumferential direction is evenly distributed.

Although a preferred embodiment of the invention has been specifically illustrated and described herein, it is to be understood that minor variations may be made in the apparatus without departing from the spirit and scope of the invention, as defined the appended claims.

What is claimed is:

1. A closure cap (1) for a container containing a carbonated beverage comprising an end panel (2) joined at a radius portion (7) to a depending peripheral skirt (4); said end panel (2), radius portion (7) and depending peripheral skirt (4) each including an inner surface; said radius portion inner surface defining a transition surface between said end panel inner surface and an uppermost peripheral inner surface portion of said peripheral skirt inner surface; a cap thread (6) below said uppermost peripheral inner surface portion of said peripheral skirt inner surface for threading the closure cap (1) to an associated container mouth, a plurality of peripherally spaced substantially stiff reinforcing rib means (8, 38, 48, 58) for stiffening said peripheral skirt (4) at said uppermost peripheral inner surface portion and said end panel (2) at said transition surface thereby preventing at least one of radial outward peripheral skirt bulging and spreading between the peripheral skirt and the end panel; said plurality of reinforcing rib means (8, 38, 48, 58) being a plurality of reinforcing ribs extending axially from said end panel inner surface along and projecting radially inwardly from and beyond said uppermost peripheral skirt inner surface and terminating contiguous said cap thread, said cap thread (6) having a thread end portion located contiguous said uppermost peripheral inner surface portion, a plane through said thread end portion defining an imaginary screwing line (S), said plurality of reinforcing ribs each having a terminal end contiguous said imaginary screwing line (S), and at least some of said reinforcing ribs being of different axial lengths.

2. The closure cap as defined in claim 1 wherein said cap thread (6) has a thread end (10) located contiguous said uppermost peripheral inner surface portion, and said plurality of reinforcing ribs are located in a peripheral region (9) adjacent said thread end (10).

3. The closure cap as defined in claim 1 wherein said cap thread (6) has a thread end portion located contiguous said uppermost peripheral inner surface portion, a plane through said thread end portion defines an imaginary screwing line (S), and said plurality of reinforcing ribs each have a terminal end contiguous said imaginary screwing line (S).

4. The closure cap as defined in claim 1 wherein said cap thread (6) has a thread end portion located contiguous said uppermost peripheral inner surface portion, a plane through said thread end portion defines an imaginary screwing line (S), said plurality of reinforcing ribs each have a terminal end contiguous said imaginary screwing line (S), and at least one of said reinforcing ribs projects axially downwardly beyond said imaginary screwing line (S).

5. The closure cap as defined in claim 1 wherein said cap thread (6) has a thread end portion located contiguous said uppermost peripheral inner surface portion, a plane through said thread end portion defines an imaginary screwing line (S), said plurality of reinforcing ribs each have a terminal end contiguous said imaginary screwing line (S), and at least one of said reinforcing ribs projects axially downwardly to but not beyond said imaginary screwing line (S).

6. The closure cap as defined in claim 1 wherein said plurality of reinforcing ribs are located in a peripheral region (9) of said uppermost peripheral inner surface portion which extends over an angular section (α) of substantially 90°.

7. The closure cap as defined in claim 1 wherein said plurality of reinforcing ribs are located in a peripheral region (9) of said uppermost peripheral inner surface portion, another plurality of peripherally spaced substantially stiff reinforcing rib means for stiffening said peripheral skirt (4) at said uppermost peripheral inner surface portion and said end panel (2) at said transition surface thereby preventing at least one of radial outward peripheral skirt bulging and spreading between the peripheral skirt and the end panel; said another plurality of rib means being another plurality of reinforcing ribs extending axially from said end panel inner surface along and projecting radially inwardly beyond said uppermost peripheral skirt inner surface and terminate contiguous said cap thread, and said another plurality of reinforcing ribs (18) and said first-mentioned plurality of reinforcing ribs (8, 38, 48, 58) being located at different angular regions of said uppermost peripheral inner surface portion.

8. The closure cap as defined in claim 1 wherein said plurality of reinforcing ribs are located in a peripheral region (9) of said uppermost peripheral inner surface portion, another plurality of peripherally spaced substantially stiff reinforcing rib means for stiffening said peripheral skirt (4) at said uppermost peripheral inner surface portion and said end panel (2) at said transition surface thereby preventing at least one of radial outward peripheral skirt bulging and spreading between the peripheral skirt and the end panel; said another plurality of rib means being another plurality of reinforcing ribs extending axially from said end panel inner surface along and projecting radially inwardly beyond said uppermost peripheral skirt inner surface and terminate contiguous said cap thread, said another plurality of reinforcing ribs (18) and said first-mentioned plurality of reinforcing ribs (8, 38, 48, 58) being located at different angular regions of said uppermost peripheral inner surface portion, and said another plurality of reinforcing ribs each have substantially the same axial length (l).

9. The closure cap as defined in claim 1 wherein said plurality of reinforcing ribs each project radially inwardly such that innermost faces (11) of said plurality of reinforcing ribs lie on an imaginary cylinder (2) corresponding substantially to an outer cylindrical surface of an associated container mouth.

10. The closure cap as defined in claim 2 wherein said plurality of reinforcing ribs are located in a peripheral region (9) of said uppermost peripheral inner surface portion which extends over an angular section (α) of substantially 90°.

11. The closure cap as defined in claim 2 wherein said plurality of reinforcing ribs are located in a peripheral region (9) of said uppermost peripheral inner surface portion, another plurality of peripherally spaced substantially stiff reinforcing rib means for stiffening said peripheral skirt (4) at said uppermost peripheral inner surface portion and said end panel (2) at said transition surface thereby preventing at least one of radial outward peripheral skirt bulging and spreading between the peripheral skirt and the end panel; said another plurality of rib means being another plurality of reinforcing ribs extending axially from said end panel inner surface along and projecting radially inwardly beyond said uppermost peripheral skirt inner surface and terminate contiguous said cap thread, and said another plurality of reinforcing ribs (18) and said first-mentioned plurality of reinforcing ribs (8, 38, 48, 58) being located at different angular regions of said uppermost peripheral inner surface portion.

12. The closure cap as defined in claim 3 wherein said plurality of reinforcing ribs are located in a peripheral region (9) of said uppermost peripheral inner surface portion which extends over an angular section (α) of substantially 90°.

13. The closure cap as defined in claim 3 wherein said plurality of reinforcing ribs are located in a peripheral region (9) of said uppermost peripheral inner surface portion, another plurality of peripherally spaced substantially stiff reinforcing rib means for stiffening said peripheral skirt (4) at said uppermost peripheral inner surface portion and said end panel (2) at said transition surface thereby preventing at least one of radial outward peripheral skirt bulging and spreading between the peripheral skirt and the end panel; said another plurality of rib means being another plurality of reinforcing ribs extending axially from said end panel inner surface along and projecting radially inwardly beyond said uppermost peripheral skirt inner surface and terminate contiguous said cap thread, and said another plurality of reinforcing ribs (18) and said first-mentioned plurality of reinforcing ribs (8, 38, 48, 58) being located at different angular regions of said uppermost peripheral inner surface portion.

14. The closure cap as defined in claim 4 wherein said plurality of reinforcing ribs are located in a peripheral region (9) of said uppermost peripheral inner surface portion which extends over an angular section ($\alpha$) of substantially 90°.

15. The closure cap as defined in claim 4 wherein said plurality of reinforcing ribs are located in a peripheral region (9) of said uppermost peripheral inner surface portion, another plurality of peripherally spaced substantially stiff reinforcing rib means for stiffening said peripheral skirt (4) at said uppermost peripheral inner surface portion and said end panel (2) at said transition surface thereby preventing at least one of radial outward peripheral skirt bulging and spreading between the peripheral skirt and the end panel; said another plurality of rib means being another plurality of reinforcing ribs extending axially from said end panel inner surface along and projecting radially inwardly beyond said uppermost peripheral skirt inner surface and terminate contiguous said cap thread, and said another plurality of reinforcing ribs (18) and said first-mentioned plurality of reinforcing ribs (8, 38, 48, 58) being located at different angular regions of said uppermost peripheral inner surface portion.

16. The closure cap as defined in claim 5 wherein said plurality of reinforcing ribs are located in a peripheral region (9) of said uppermost peripheral inner surface portion which extends over an angular section ($\alpha$) of substantially 90°.

17. The closure cap as defined in claim 5 wherein said plurality of reinforcing ribs are located in a peripheral region (9) of said uppermost peripheral inner surface portion, another plurality of peripherally spaced substantially stiff reinforcing rib means for stiffening said peripheral skirt (4) at said uppermost peripheral inner surface portion and said end panel (2) at said transition surface thereby preventing at least one of radial outward peripheral skirt bulging and spreading between the peripheral skirt and the end panel; said another plurality of rib means being another plurality of reinforcing ribs extending axially from said end panel inner surface along and projecting radially inwardly beyond said uppermost peripheral skirt inner surface and terminate contiguous said cap thread, and said another plurality of reinforcing ribs (18) and said first-mentioned plurality of reinforcing ribs (8, 38, 48, 58) being located at different angular regions of said uppermost peripheral inner surface portion.

18. The closure cap as defined in claim 1 wherein said plurality of reinforcing ribs are located in a peripheral region (9) of said uppermost peripheral inner surface portion which extends over an angular section ($\alpha$) of substantially 90°.

19. The closure cap as defined in claim 1 wherein said plurality of reinforcing ribs are located in a peripheral region (9) of said uppermost peripheral inner surface portion, another plurality of peripherally spaced substantially stiff reinforcing rib means for stiffening said peripheral skirt (4) at said uppermost peripheral inner surface portion and said end panel (2) at said transition surface thereby preventing at least one of radial outward peripheral skirt bulging and spreading between the peripheral skirt and the end panel; said another plurality of rib means being another plurality of reinforcing ribs extending axially from said end panel inner surface along and projecting radially inwardly beyond said uppermost peripheral skirt inner surface and terminate contiguous said cap thread, and said another plurality of reinforcing ribs (18) and said first-mentioned plurality of reinforcing ribs (8, 38, 48, 58) being located at different angular regions of said uppermost peripheral inner surface portion.

\* \* \* \* \*